United States Patent [19]
Collins

[11] Patent Number: 5,471,951
[45] Date of Patent: Dec. 5, 1995

[54] PEST DETERRENT FOR TRAY-STYLE BIRD FEEDER RESPONSIVE TO TILTING OF FEEDER

[76] Inventor: Dennis I. Collins, 322 River Wooods, Burnsville, Minn. 55337

[21] Appl. No.: 312,539

[22] Filed: Sep. 26, 1994

[51] Int. Cl.$^6$ ...................................................... A01K 5/00
[52] U.S. Cl. ........................ 119/57.9; 119/52.3; 119/908
[58] Field of Search ................................. 119/57.8, 57.9, 119/52.3, 52.2, 908, 903; 340/573, 689

[56] References Cited

U.S. PATENT DOCUMENTS

| | | | |
|---|---|---|---|
| 2,344,367 | 3/1944 | Pueschel | 119/52 |
| 2,628,592 | 2/1953 | Johnston | 119/908 |
| 2,783,740 | 3/1957 | Haggard | 119/908 |
| 2,856,898 | 10/1958 | Doubleday et al. | 119/51 |
| 3,362,023 | 1/1968 | McMahon | 340/573 |
| 3,827,403 | 8/1974 | Meyer | 119/908 |
| 3,885,576 | 5/1975 | Symmes | 340/689 |
| 5,150,665 | 9/1992 | Boaz | 119/52.3 |
| 5,191,857 | 3/1993 | Boaz | 119/57.9 |
| 5,285,747 | 2/1994 | Caldine | 119/57.9 |

*Primary Examiner*—Todd E. Manahan
*Attorney, Agent, or Firm*—James V. Harmon

[57] ABSTRACT

The invention provides a pest deterrent apparatus for a tray-style bird feeder. The apparatus comprises a portable, self-contained source of high voltage that will produce a harmless electric shock for frightening away a pest such as a squirrel, cat, or other animal that comes into contact with the high voltage source. Shocking conductors are wired across the high voltage source so that a high voltage electric circuit is completed through the body of the pest when the pest comes into contact with the shocking conductors. The bird feeder is supported in such a way that it will tilt when a pest is on the feeder. A tilt-responsive switch means is operatively wired to the high voltage source for normally turning the high voltage source off and turning the high voltage source on in response to the tilting of the feeder caused by the weight of the pest on the bird feeder so as to close the switch, thereby giving the pest a harmless electric shock.

12 Claims, 2 Drawing Sheets

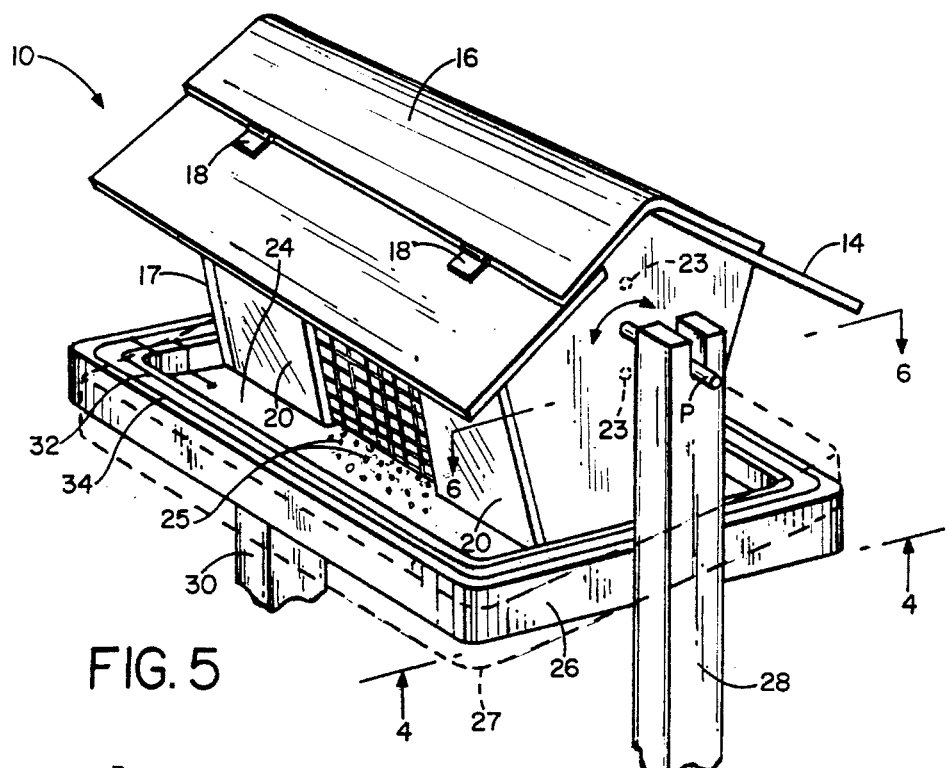
FIG. 5
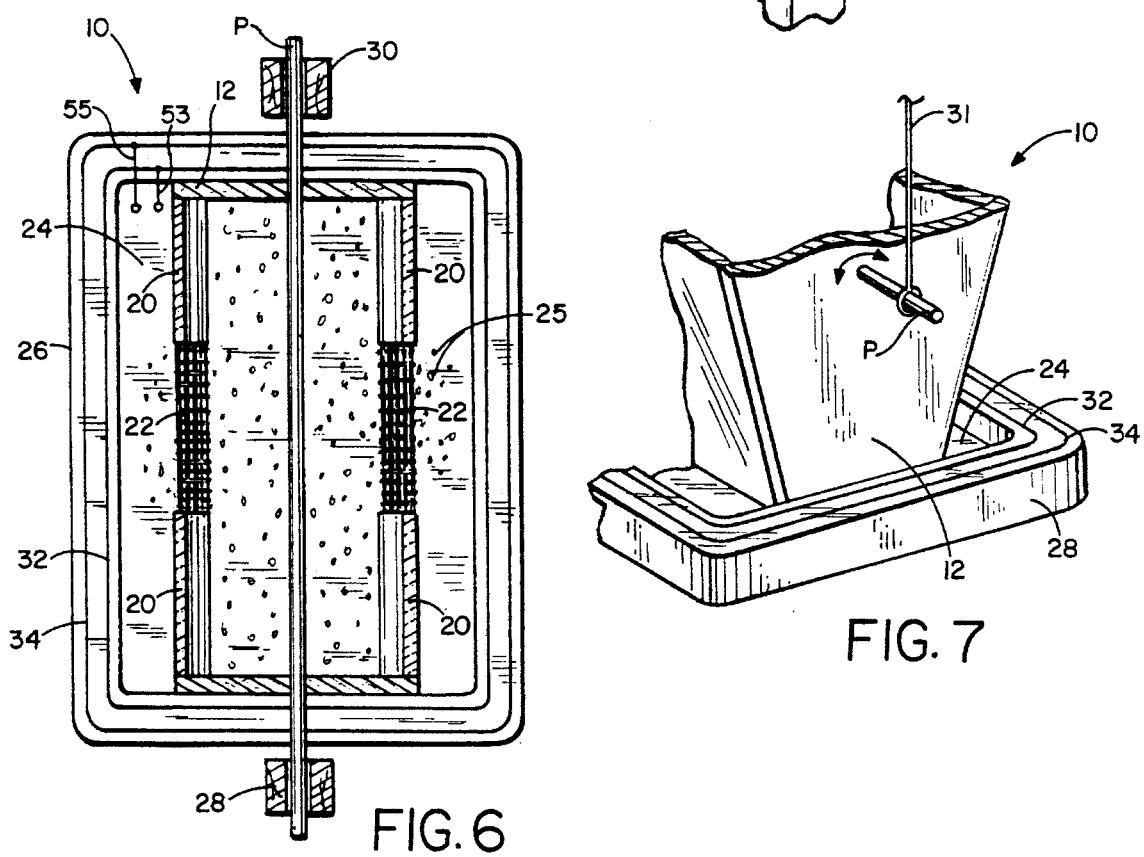
FIG. 6
FIG. 7

5,471,951

PEST DETERRENT FOR TRAY-STYLE BIRD FEEDER RESPONSIVE TO TILTING OF FEEDER

FIELD OF THE INVENTION

This invention relates to a system for deterring pests and more particularly for an electrical shocker for providing a harmless high voltage electrical shock to frighten away pests such as squirrels from a bird feeder.

BACKGROUND OF THE INVENTION

Electrical shocking devices have been previously proposed for use on bird feeders. For example, U.S. Pat. No. 5,285,747 provides an electric shock, but in order to be shocked the pest must touch two perches that are spaced vertically from one another by a substantial distance. If the pest does not touch both perches simultaneously, it will not receive a shock.

U.S. Pat. No. 5,150,665 also has a pair of vertically spaced apart conductors, one of which must be touched by a squirrel's front feet and one by the squirrel's rear feet. It is unlikely that a squirrel will invariably assume this position. Consequently, the device will not be consistent in deterring pests.

U.S. Pat. No. 2,856,898 describes an animal-proof bird feeder with a coil spring mounted around a support rod that allows one contact to rub over serrations on another contact to make and break a primary circuit for shocking a pest. I have found that electrical components such as contact points and other moving parts can rust or corrode over time, particularly from adverse weather conditions including rain, snow and sleet. It will also be noted that the patented bird feeder requires a special bird feeder design having support spring, rod and contact points at the top with a battery casing below it. Consequently, the patented bird feeder has to be specially constructed and is not suited for use in a variety of tray-style bird feeders already on the market.

In view of these and other deficiencies of the prior art, it is one object of the present invention to provide a compact self-contained pest deterrent device for a tray-style bird feeder that is small in size and can be mounted unobtrusively on a wide variety of tray-style bird feeders already in use and on the market, i.e., one that is suited for being mounted upon existing tray-style bird feeders as a retrofit unit or mounted at the factory by the manufacturer of any of a variety of tray-style bird feeders now being manufactured and sold by various producers without having to change the design of the feeder except for the manner in which it is supported.

Another object is to provide a pest deterrent device for a tray-style bird feeder that is more positive acting in the sense that it will much more reliably give a harmless shock to a pest but will not shock birds.

A further object is to provide a device of the type described that is not subject to corrosion or other damage and will remain highly effective in operation even though exposed to adverse weather conditions including snow, sleet, rain, etc.

A further, more specific object is to provide an improved pest deterrent of the type described that is compact, self-contained, rugged in construction, relatively inexpensive and adapted to produce a powerful but harmless shock that will reliably shock a pest but at the same time provides dual protection for birds by (a) locating conductors away from where birds normally perch and (b) having a provision for preventing birds from turning on the current.

These and other more detailed and specific objects of the present invention will be better understood by reference to the following figures and detailed description which illustrate by way of example but a few of the various forms of the invention within the scope of the appended claims.

THE FIGURES

FIG. 5 is a perspective view of a typical bird feeder in accordance with the invention;

FIG. 6 is a horizontal cross-sectional view taken on line 6—6 of FIG. 5; and

FIG. 7 is a partial perspective view of a modified form of the invention.

SUMMARY OF THE INVENTION

The invention provides a pest deterrent apparatus for a tray-style bird feeder. The apparatus comprises a portable, self-contained source of high voltage that will produce a harmless electric shock for frightening away a pest such as a squirrel, cat, or other animal that comes into contact with the high voltage source. Shocking conductors are wired across the high voltage source so that a high voltage electric circuit is completed through the body of the pest when the pest comes into contact with the shocking conductors. The bird feeder is supported in such a way that it will tilt when a pest is on the feeder. A tilt-responsive switch means is operatively wired to the high voltage source for normally turning the high voltage source off and turning the high voltage source on in response to the tilting of the feeder caused by the weight of the pest on the bird feeder so as to close the switch, thereby giving the pest a harmless electric shock.

In one preferred form of the invention, the bird feeder is mounted on a pivot such as a horizontal pivot rod that will allow the bird feeder to be tilted when a pest such as a squirrel gets onto the feeder. It is also preferred that the tilt-responsive switch is at least one and preferably two mercury switches mounted in a casing, each at a selected angle with respect to the wall of the casing so that when the casing is affixed to the bird feeder each mercury switch has a selected angle on the bird feeder. Consequently, the tilting of the bird feeder to a selected angle will close one of the mercury switches and thereby turn on the high voltage source.

DETAILED DESCRIPTION OF THE INVENTION

Figure 1:
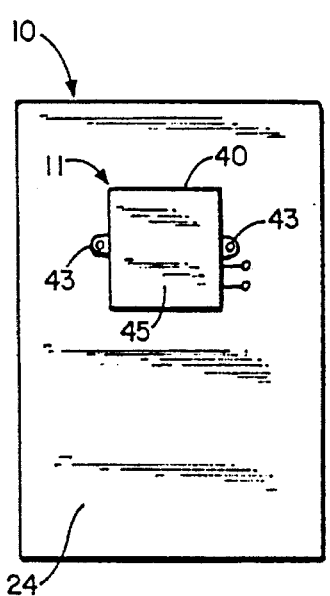
FIG. 1 is a bottom view of a bird feeder showing my pest deterrent apparatus mounted on the bottom wall of the bird feeder.
Figure 2:
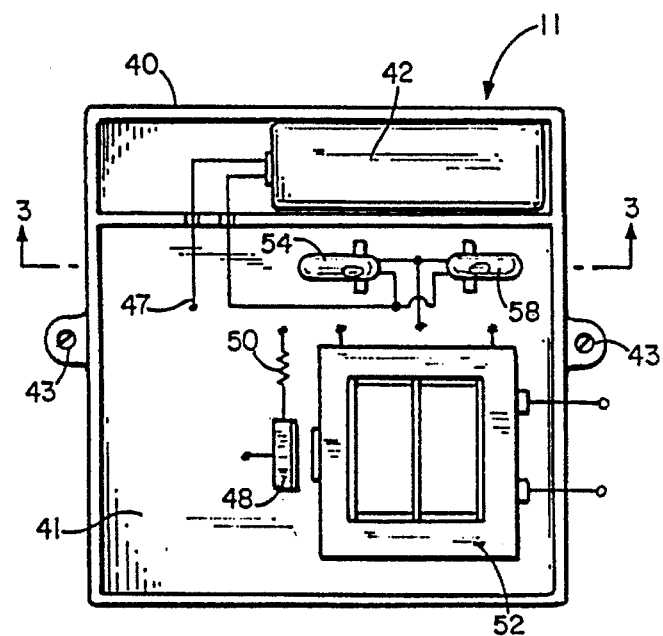
FIG. 2 is a plan view of the electric shock-producing apparatus of FIG. 1 on a larger scale with the cover removed.
Figure 3:
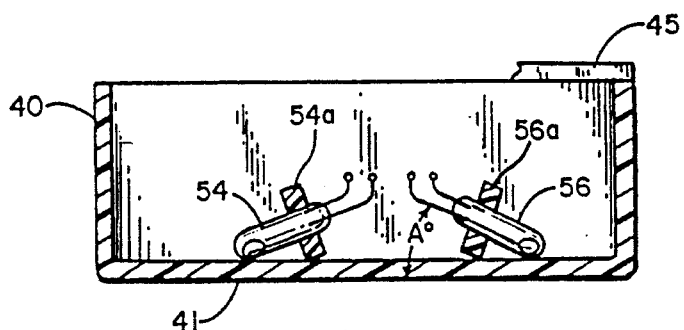
FIG. 3 is a vertical cross-sectional view taken on line 3—3 of FIG. 2.
Figure 4:
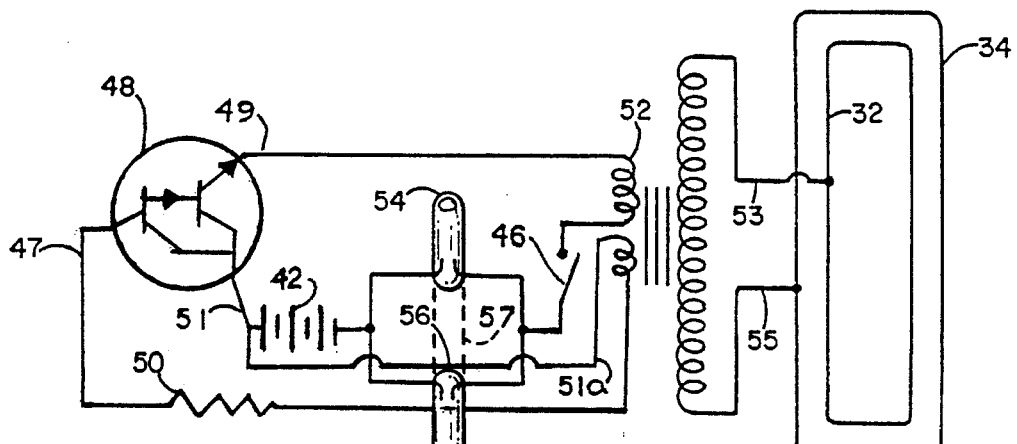
FIG. 4 is a schematic electrical wiring diagram of the invention.

Refer now to FIGS. 1–4. Shown in FIG. 1 is a tray-style bird feeder indicated generally at 10 as seen from the bottom. Attached to the feeder 10 is a high voltage pest deterrent apparatus 11 in accordance with the invention. The pest deterrent apparatus 11 includes a casing 40 that can be injection molded plastic having side, top and bottom walls as shown. The bottom wall is designated 41. The casing 40 is secured to the bird feeder 10 by any suitable means as by means of screws 43. The contents of the casing 40 can be enclosed beneath a cover 45 (FIG. 1). Inside the casing 40 is a source of high voltage including a battery 42, a transistor 48 which can be a Darlington transistor having a base that is connected by conductor 47 via resistor 50 to one primary winding of a step-up transformer 52, the other end of which is wired to the collectors via conductors 51 and 53. The collectors are also connected by conductor 51 to the battery 42 which is wired in series with two parallel connected mercury switches 54, 56 and with an on/off switch 46 which is in turn connected to one terminal of the second primary winding of the transformer 52, the other end of which is coupled via conductor 49 to the emitter of the transistor 48. During operation, the transistor 48 functions as an oscillator for repeatedly interrupting current to the transformer 52. Many other variations can be made in the circuitry used to provide a source of high voltage as will be apparent to those skilled in the art. For example, the transistor 48 can be replaced with a buzzer. If desired, the mercury switches 54, 56 can be replaced with a single mercury switch, e.g., one having a curved tube 57 with terminals on opposite ends of the single glass tube. The term "mercury switch means" herein refers to both a single mercury switch or two separate mercury switch as shown in FIGS. 2–4.

The high voltage terminals of the transformer 52 are connected at 53 and 55 to a pair of spaced apart shocking conductors 32 and 34 which are without insulation so as to make good electrical contact with the pest. It will be seen that the high voltage pest deterrent apparatus 11 is self-contained, compact, will not be subject to damage from severe weather, and has no moving parts that can become frozen or corroded. The casing 40 can be smaller than the size of a pack of cigarettes. Other high voltage sources can be used, such as those provided in commercially available stun guns or high voltage source for a cattle prod, e.g., a cattle prod device by the HotShot Company of Savage, Minn. These commercial units, of course, are not tilt responsive.

Refer now to FIG. 3 which illustrates the arrangement of the tilt-responsive mercury switches 54 and 56. It is important that the switches 54 and 56 lie at a particular angle of inclination with respect to the casing 40 and to the wall 41 of the casing 40 to insure proper operation. It is also important to provide a reliable means for establishing the proper angular relationship. I have accomplished this objective in a way that will assure precise and rapid hand assembly; namely, by placing a small positioning member, e.g., a section of rubber tubing 54a, 56a around the end of each mercury switch near the electrical terminals. Then, when the mercury switches 54, 56 are placed in the casing 40 against the bottom wall 41 during assembly, the proper angle A of inclination between the axis of each mercury switch and the bottom wall 41 of the casing 40 is accurately and precisely controlled. The switches 54, 56 are then bonded in place as are the other components in the casing 40, except the battery, by means of an adhesive or suitable potting compound (not shown). In this way the invention provides a portable, self-contained high voltage source and a position responsive switch means mounted in a casing at a selected angle A with respect to the wall 41 oil the casing 40 so that when the casing 40 is affixed to the bird feeder, the switches 54 and 56 have a selected angle on the bird feeder. Consequently, the tilting of the bird feeder to a particular degree will close one of the switches 54 or 56 and thereby turn on the high voltage source. It will be seen that two mercury switches 54, 56 are used, each with the same angle A of inclination with respect to the wall 41 of the casing 40 (and consequently the entire bird feeder), but each switch is inclined in the opposite direction of the other. During use both switches 54, 56 will be open when the bird feeder is upright, the switch 56 will close when the left side of the casing 40 is lowered by the pest as seen in FIG. 3, and the switch 54 will close when the right side of the casing 40 is lowered by the pest as seen in FIG. 3. As a result, readily available and inexpensive mercury switches can be employed that will operate reliably to be open when the feeder is upright and to turn on the current regardless of which side of the bird feeder the pest is located. Moreover, once the casing 40 is mounted on the bottom of feeder 10, the correct angular relationship is established automatically between the switches 54, 56 and the feeder 10 to assure proper operation.

Refer now to FIG. 5 which illustrates a typical tray-style bird feeder with which the invention can be used. It should be pointed out that the invention can be installed at the factory by the manufacturer of any of a variety of bird feeders now being produced and is not limited to use with a bird feeder of any particular design. It can also be retrofitted as an add-on unit to existing bird feeders. A typical bird feeder 10 includes a feed container 12 with a top or roof portion 14 having a cover 16 connected by means of hinges 18 which allow the cover 16 to be lifted for placing bird feed in the feeder. The feed container 12 includes inclined glass side walls 20 having lower edges that are spaced apart slightly from the feeding tray 24 to allow the feed 25 to spread outwardly onto the tray 24. In this case a portion of the side walls 20 of the feed container 12 are formed from screen 22 that also allows the feed 25 to fall onto the tray 24. While not essential, it is preferred that the tray 10 have a peripheral raised rim 26. The term "rim" herein refers to a peripheral edge portion of the feeding tray 24 whether or not it is raised from the upper surface of the tray. The rim 26 serves two purposes. It keeps the feed 25 from falling onto the ground and also serves as a support for the shocking conductors 32, 34 which are bonded to its upper surface as two radially spaced apart, horizontally disposed, circumferentially extending loop conductors. The conductor loops 32, 34 can be fastened to the top surface of the rim 26 by any suitable means, e.g., by adhesive, staples or other fasteners and are spaced apart typically about one-quarter to one-half inch.

Extending horizontally through the bird feeder 10 is a pivot rod P which is supported at each end within a notch or groove at the top of two support posts 28 and 30, one for each end of the rod P which serves as a pivot allowing the bird feeder 10 to be tilted about the axis of the rod, e.g., as shown by dotted line 27 in FIG. 5 when a pest such as a squirrel gets onto the tray 24. I have found that a squirrel will virtually always place at least one paw on the rim 26 and will consequently come into contact with the shocking conductors 32, 34 causing it to be given a harmless electric shock when its own weight causes the bird feeder 10 and the casing 40 of the pest deterrent apparatus to be tilted so as to close one of the mercury switches 54 or 56.

The bird feeder 10 does not have to be supported on the posts 28, 30 but, if desired, can be supported by a pair of laterally spaced apart support wires 31 (only one of which is shown in FIG. 7). The bird feeder 10 of FIG. 7 will tilt about the axis of the pivot rod P in the same manner already described.

The invention thus provides a reliable source of high voltage that will produce a harmless electric shock for frightening away a pest such as a squirrel or cat that comes in contact with the shocking conductors 32, 34. Birds, however, are protected in two ways: (a) the shocking conductors 32, 34 are away from the tray or platform 24 where the birds stand when they are eating, and (b) the birds are not heavy enough to tilt the feeder 10.

The invention is rugged in construction, reliable in operation and requires no springs or open contact points which could be subject to corrosion. The bird feeder 10 can be made more or less sensitive by raising or lowering the rod P on the bird feeder 10 to different locations shown at 23 in FIG. 5. If the rod P is raised, the bird feeder 10 will tilt less and if the rod P is lowered, the bird feeder will tilt more when the pest is on the tray 24. I have found that typically the pivot rod P can be about six inches above the tray 24. The angle A can be about 5° to 10°. The shocking conductors 32, 34 are typically spaced about one-fourth to one-half inch apart.

While a variety of circuit constants can be used, the battery 42 can be a 9-volt battery, the transistor 48 can be a Motorola 102 transistor, the mercury switches 54, 56 can be tubular glass switches about one-half inch in length, and the transformer 52 can have primary windings of about 100 and 200 turns and a secondary winding of about 3400 turns so as to produce sufficient voltage, e.g., about 4000 volts at 15 milliamperes for providing a startling but harmless electrical shock to the pest.

Many variations of the present invention within the scope of the appended claims will be apparent to those skilled in the art once the principles described herein are understood.

What is claimed is:

1. The combination of a pest deterrent apparatus and a tray-style bird feeder comprising:

a portable, self-contained source of high voltage that will provide a harmless electric shock for frightening away a pest that comes into electrical contact with the high voltage source, electrical shocking conductors supported on the bird feeder and wired to the high voltage source for providing a high voltage electric circuit through the body of the pest when the pest comes into contact with the electrical conductors, tilt-responsive switch means operatively wired to the high voltage source for turning the high voltage source off when the apparatus is upright and for turning the high voltage source on in response to tilting of the apparatus to thereby provide a high voltage potential across said electrical conductors for shocking a pest that is in contact therewith, the bird feeder has a tillable support for allowing the bird feeder to tilt about said tillable support in response to the weight of a pest thereon and the tilt responsive switch means is a mercury switch affixed rigidly within a casing at a selected angle with respect to a wall of the casing.

2. The combination of a pest deterrent apparatus and a tray-style bird feeder comprising.

a portable, self-contained source of high voltage that will provide a harmless electric shock for frightening away a pest that comes into electrical contact with the high voltage source, electrical shocking conductors wired to the high voltage source for providing a high voltage electric circuit through the body of the pest when the pest comes into contact with the electrical conductors, tilt-responsive switch means operatively wired to the high voltage source for turning the high voltage source off when the apparatus is upright and for turning the high voltage source on in response to tilting of the apparatus to thereby provide a high voltage potential across said electrical conductors for shocking a pest that is in contact therewith, the switch means includes a pair of tilt responsive switches wired to the high voltage source, one said switch is operative for turning on the high voltage source when the bird feeder is tilted by a pest in a first direction and the other said switch is operative for turning on the high voltage source when the bird feeder is tilted by a pest in a second direction opposite of said first direction.

3. The apparatus of claim 2 wherein, the portable self-contained high voltage source and the tilt responsive switch means are mounted in a casing, the casing is affixed during use to the bird feeder, the switch means has a selected angle of inclination relative to the bird feeder when the casing is mounted upon the feeder, whereby tilting of the bird feeder to a selected angle of inclination to a vertical axis will close the tilt responsive switch means to turn on the high voltage source.

4. The apparatus of claim 3 wherein the tilt responsive switch means means is a mercury switch affixed rigidly within the casing at a selected angle with respect to the casing.

5. The apparatus of claim 2 wherein the switches are mercury switches each positioned at the same angle of inclination as the other but each switch is inclined in the opposite direction from the other switch and said switches are wired in parallel with each other for selectively actuating the high voltage source.

6. The apparatus of claim 2 wherein said high voltage source includes a battery wired to said switches and to a step-up transformer and to an oscillator for repeatedly interrupting current to the transformer.

7. The combination of a pest deterrent apparatus and a tray-style bird feeder comprising:

a portable, self-contained source of high voltage that will provide a harmless electric shock for frightening away a pest that comes into electrical contact with the high voltage source, electrical shocking conductors wired to the high voltage source for providing a high voltage electric circuit through the body of the pest when the pest comes into contact with the electrical conductors, tilt-responsive switch means operatively wired to the high voltage source for turning the high voltage source off when the apparatus is upright and for turning the high voltage source on in response to tilting of the apparatus to thereby provide a high voltage potential across said electrical conductors for shocking a pest that is in contact therewith, the bird feeder has a pivotal support for allowing the bird feeder to tilt about said pivotal support in response to the weight of a pest thereon and the tilt responsive switch means is a mercury switch affixed rigidly within a casing at a selected angle with respect to a wall of the casing.

8. The apparatus of claim 7 wherein the shocking conductors are radially spaced apart, parallel and adjacent, horizontally disposed circumferentially extending loop conductors that are mounted during use upon the bird feeder.

9. The combination of a tray-style bird feeder and a pest deterrent apparatus comprising:

a tray-style bird feeder having a feed container with a horizontally disposed tray for supporting bird feed and to serve as a surface upon which the birds can stand while eating the feed, exposed shocking conductor means mounted upon the bird feeder in a position to be contacted by a pest when the pest stands on the bird feeder, a portable, self-contained high voltage source wired to the shocking conductor means for producing an electric shock to frighten away the pest when the pest comes in contact with the exposed shocking conductor means, a support connected to the bird feeder that will allow the feed support tray to tilt downwardly under to the weight of a pest when the pest is supported thereon, the high voltage source comprises a battery wired to a step-up transformer and to a transistor for varying current to the transformer, and a pair of mercury switches operatively wired to the high voltage source to turn on and off the high voltage source, and each mercury switch is mounted at a selected angle with respect to the bird feeder for supplying current to the transformer only when the bird feeder is tilted by the pest with respect to a vertical axis.

10. The apparatus of claim 9 wherein the support is a horizontal pivot member connected to the bird feeder.

11. The apparatus of claim 9 wherein the bird feeder has a raised rim extending peripherally of the feeder tray and the shocking conductor means is a pair of spaced apart conductors connected to an upper surface of said raised rim for making electrical contact with the pest when the pest places a paw on the raised rim.

12. The apparatus of claim 9 wherein the high voltage source and the mercury switches are mounted in a casing, positioning members are secured to the mercury switches for orienting each switch at a selected angle within the casing, and the switches are bonded within the casing so that the switches will both automatically be placed at a selected angle relative to the bird feeder when the casing is affixed to the bird feeder.

\* \* \* \* \*